United States Patent [19]

Good

[11] Patent Number: 5,069,480
[45] Date of Patent: Dec. 3, 1991

[54] AIR BAG RETAINER ASSEMBLY

[75] Inventor: Stanley B. Good, Richmond, Mich.

[73] Assignee: Allied-Signal Inc., Morris Township, Morris County, N.J.

[21] Appl. No.: 359,237

[22] Filed: May 31, 1989

[51] Int. Cl.$^5$ ............................................. B60R 21/20
[52] U.S. Cl. .................................................. 280/743
[58] Field of Search ............... 280/728, 742, 743, 731, 280/732

[56] References Cited

U.S. PATENT DOCUMENTS

| | | | |
|---|---|---|---|
| 4,111,475 | 9/1978 | Kob et al. | 280/743 |
| 4,153,273 | 5/1979 | Risko | 280/743 |
| 4,169,613 | 10/1979 | Barnett | 280/743 |
| 4,262,931 | 4/1981 | Strasser et al. | 280/743 |
| 4,840,397 | 6/1989 | Katz et al. | 280/743 |
| 4,842,300 | 6/1989 | Ziomek | 280/743 |
| 4,913,461 | 4/1990 | Cuevas | 280/731 |
| 4,915,410 | 4/1990 | Bachelder | 280/743 |

Primary Examiner—Richard A. Bertsch

[57] ABSTRACT

An air bag assembly (20) comprising a reaction housing assembly (30) comprising a first member (34) defining top (50), bottom (52) and rear wall (54), and a plurality of end plates (40a,b) adapted to mate with open ends (56a,b) of the first member (34), the first member (34) and end plates (40a,b) defining an open mouth (44). A first one (40a) of the end plates (40a,b) includes a clearance hole (70) and a second end plate (40b) includes an outwardly extending recessed boss (72). A pillow assembly (90) is received into and recessed rearward of the open mouth (44), including a pillow retainer (92) secured to the reaction housing assembly and an inflatable pillow (100) or air bag attached to the pillow retainer (82); the pillow is stored in a compact, predeployment condition prior to inflation.

9 Claims, 3 Drawing Sheets

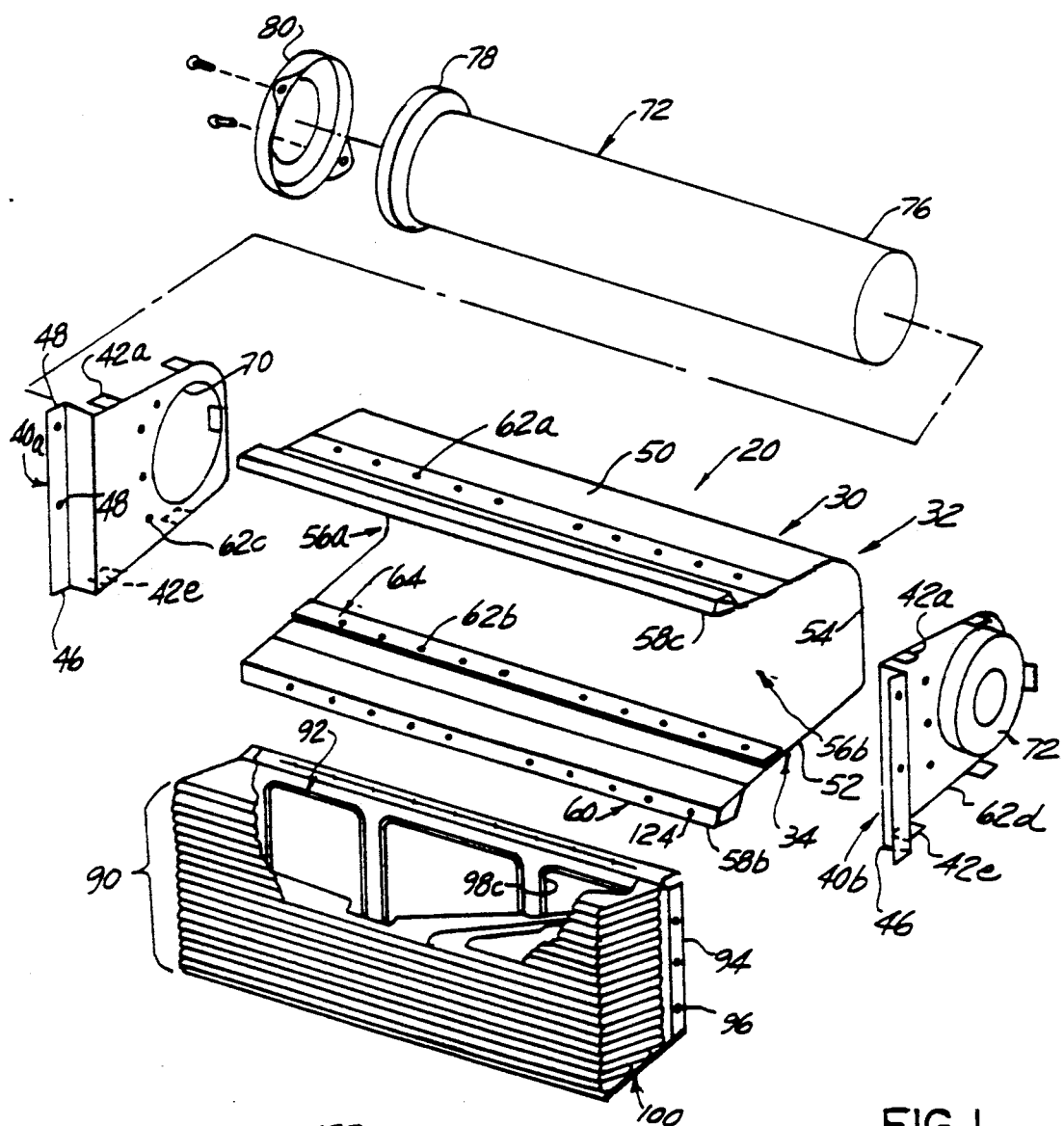
FIG. 1
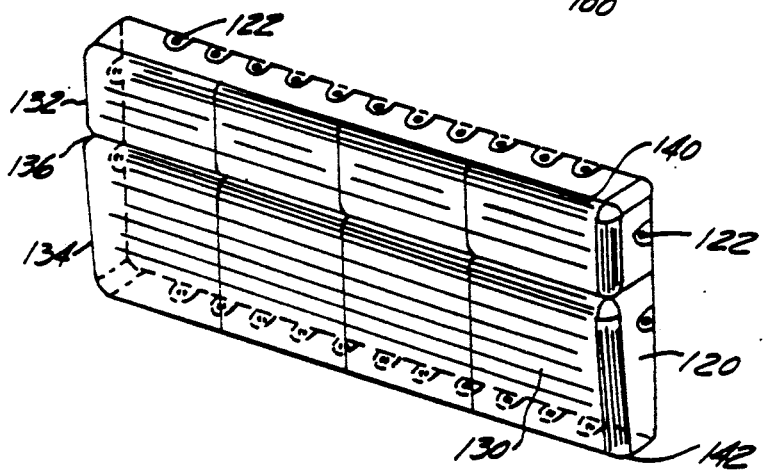

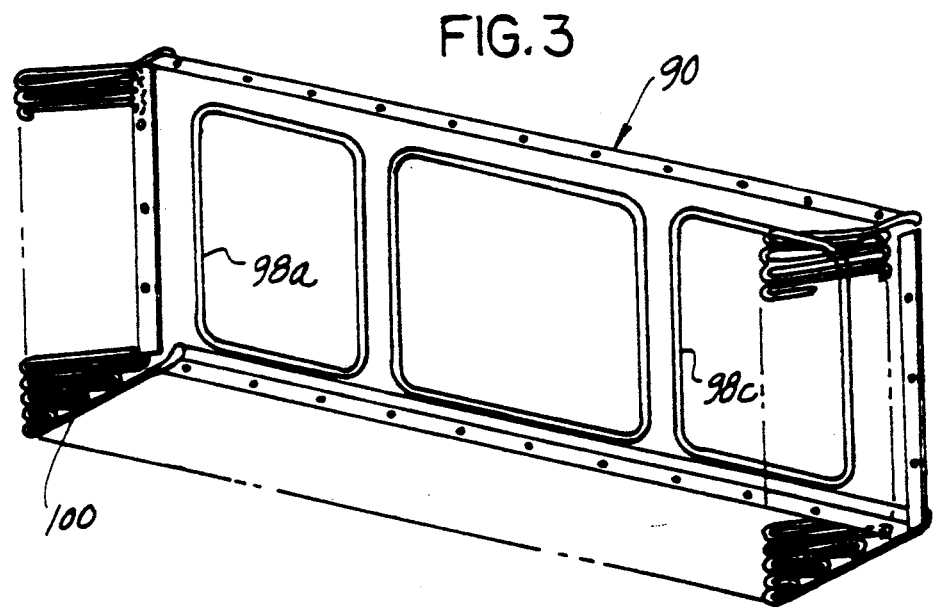
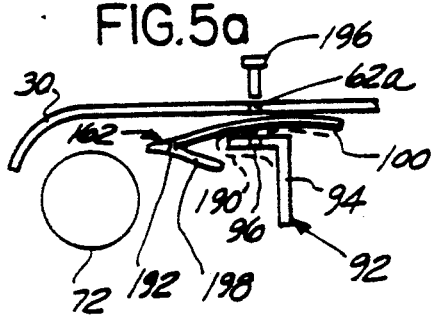
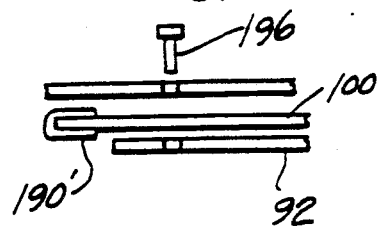
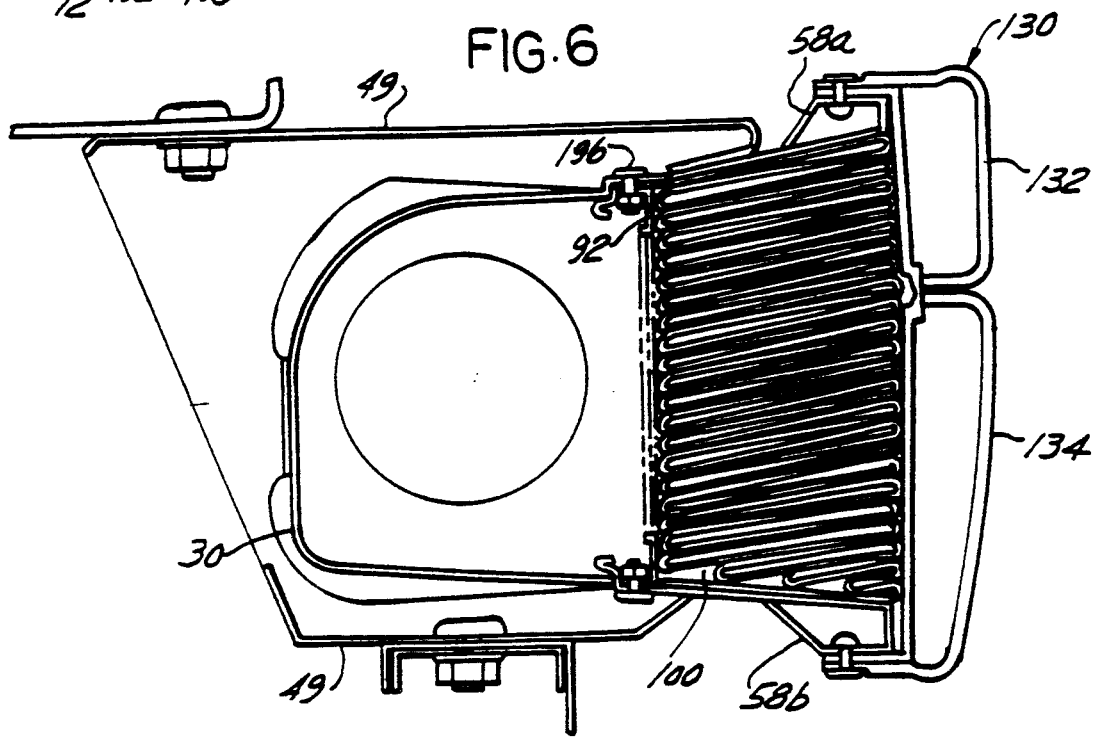

AIR BAG RETAINER ASSEMBLY

BACKGROUND AND SUMMARY OF THE INVENTION

The present invention finds application in inflatable restraint systems and particularly in an air bag system which will provide torso and head protection for at least one of the front seat passengers of a vehicle by inflating an energy absorbing pillow from its storage position.

As mentioned above the present invention finds application with a passenger side inflatable (air bag) restraint systems. One such rudimentary system would comprise a crash sensor mounted to the vehicle frame and an air bag assembly positioned within the passenger compartment. Typically these assemblies will include an outer reaction can or housing which supports a gas generator. This reaction can or housing absorbs and retransmits the air bag deployment forces to the vehicle. Typically these housing are open-mouthed containers into which the air bag is also placed. In the prior art such air bags are attached to the reaction housing about its open edge. In practice, the reaction housing, gas generator, air bag and cover are attached to the instrument panel of a vehicle. Upon deployment, the air bag ruptures the cover and expands toward the passenger (occupant). By virtue of mounting the air bag about the periphery of the open end of the reaction housing the reaction housing is susceptible to deformation or bell mouthing. This rapid and forceful deformation tends to deform closely spaced portions of the vehicle, i.e., the instrument panel, thereby causing unnecessary repairs to the vehicle.

This bell mouthing can be reduced by fabricating the reaction housing from a thicker steel but this will significantly increase the weight of the housing. It is an object of the present invention to solve the problems associated with the prior art. A further object of the present invention is to provide an air bag assembly wherein the deformation of the reaction housing is kept at a minimum during the inflation of an air bag. A further object of the present invention is to provide a relatively light weight reaction housing.

Many other objects and purposes of the invention will be clear from the following detailed description of the drawings.

BRIEF DESCRIPTION OF THE DRAWINGS

FIG. 1 is an assembly view of the present invention illustrating certain features of the present invention.

FIG. 3 illustrates a projected schematic representation of a pillow assembly;

FIGS. 5a and b illustrates in greater detail the attachment of the pillow to a retainer.

FIG. 6 illustrates a side view of the present invention and shows attachment of same to an instrument panel of a vehicle.

DETAILED DESCRIPTION OF THE DRAWINGS

Figure 2:
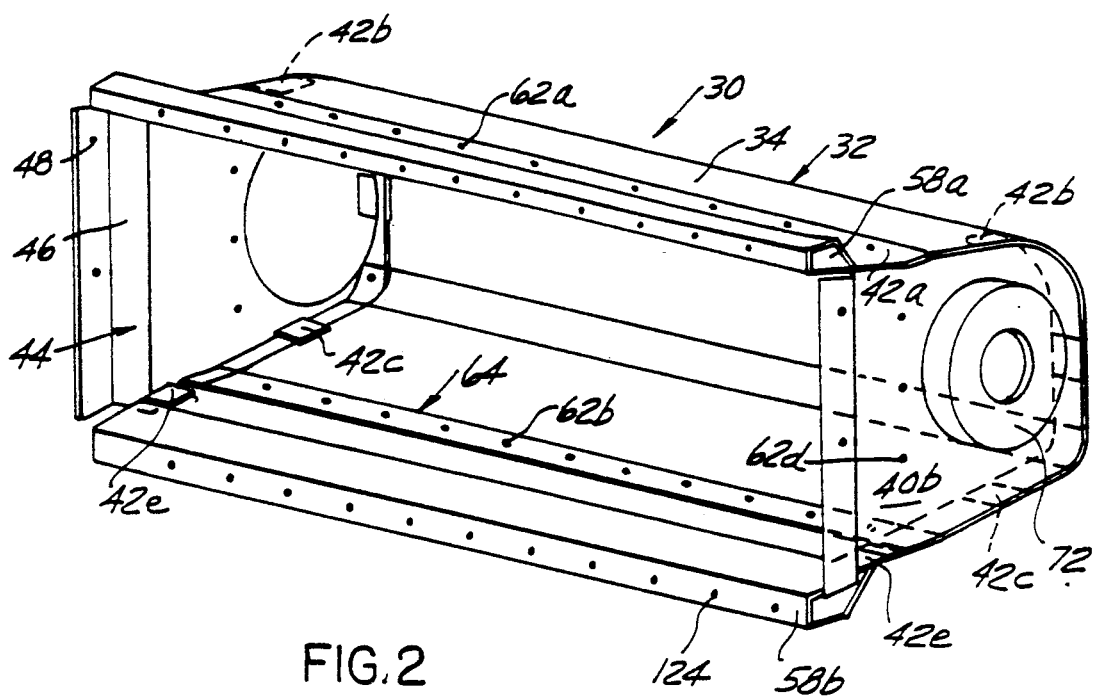
FIG. 2 illustrates a projected view of a reaction housing assembly.

With reference to FIG. 1 there is shown an assembly view of an air bag restraint assembly 20 constructed in accordance with the present invention. The air bag assembly comprises a reaction housing assembly generally shown as 30. The reaction housing assembly comprises a housing 32 which includes a first member 34. This first member may be fabricated of a carbon steel, roll-form shape, similar to that illustrated in FIG. 1. The assembly 30 and housing 32 comprises a plurality of end plates 40a, b. Upon assembly of the reaction housing 32 (see FIG. 2), the first member 34 and end plates 40a, b cooperate to define an open mouth generally shown as 44. In the illustrated embodiment of the invention, each of the end plates include a plurality of tabs such as tabs 42a–e which can face either inwardly or outwardly. These tabs facilitate the attachment of the end plates to the first member. This attachment may be accomplished by spot welding or other similar attachment methodology as known in the art. Each end plate further includes a set of openings 64c and d respectively. Each of the end plates further includes an outwardly extending flange 46. Each flange may also include another plurality of openings 48 to facilitate attachment to other portions of the assembly 20. The reaction housing 30 may be secured to a cooperating portion of the vehicle such as its instrument panel as shown in FIG. 6. Additional brackets 49, flanges etc., may be used to facilitate attachment.

The first member 34 in its rolled over configuration includes an upper surface 50, a lower surface 52, a rear surface 54. These surfaces cooperate to define open ends 56a, b into which are respectively received the end plates 40a, b. Proximate the frontal portions of surfaces 50 and 52 are respective strengthening members 58a,b which may be formed by bending over a portion of the respective surfaces 50 and 52. These strengthening portions 58a,b may further include a plurality of front facing openings 60 to further facilitate attachment of other portions of the assembly 20. Recessed from the frontal plane of the first member 34 and located in each of the surfaces 50 and 52 are another set of openings 62a,b; the purpose of which will be made clear from the description below. The portion of the first member which includes these openings 62 may further include a structural reinforcing strip generally shown as 64. Upon assembly the openings 62 in the first member 34 and the openings 48 in each end plate 40a and b respectively may be arranged to lie in the same plane.

As viewed in FIG. 1, the left end plate 40a includes a clearance hole 70 into which may be received a gas generator generally shown as 72 which may optionally be made part of a completed assembly 20. The other end plate 40b includes an outwardly extending recessed boss 72 which is also adapted to receive a narrow portion 76 of the gas generator. As illustrated in FIG. 1, the gas generator 72 comprises a solid cylindrical shape having an increased diameter portion 78. In operation the gas generator 72 would be inserted within the clearance hole 70 and seated within the recessed boss 72. The increased diameter portion 78 of the gas generator would fit within the clearance hole 70. An end cap or retainer portion generally shown as 80 is thereafter fitted to the end plate 40a securing the gas generator 72 in place.

The assembly 20 further includes a pillow (or air bag) assembly generally shown as 90. The pillow assembly 90 comprises a pillow retainer 92 shaped conformal with the interior of the assembled reaction housing 30. As illustrated, the pillow retainer 92 has a generally rectangular shape to conform with the generally rectangular interior dimensions of the reaction housing assembly 30. It should be appreciated that other shapes and forms are within the scope of the present invention. The pillow retainer 92 comprises a circumferential edge 94 having a plurality of openings 96, which upon insertion into the reaction housing assembly 30 are registered relative to the openings 48 and 62. The pillow retainer 92 further includes a plurality of larger perhaps rectangular openings 98a–c through a frontal face thereof. Gas supplied by the gas generator 72 will flow, upon activation, through these openings 96 into the pillow 100. The pillow assembly 90 is also shown in FIG. 3. Secured to the circumferential edge 94 of the pillow retainer is an air bag or pillow generally shown as 100. In its non-deployed state, the pillow 100 is stored in a generally folded condition as schematically illustrated in the above figures.

As can be appreciated from the above figures, the openings 64a–d are spaced or recessed from the frontal opening 44 of the reaction housing 32. In the preferred embodiment these openings 64 are spaced approximately half-way between the open mouth 44 and the rear surface 54, however, other placements are within the scope of the invention.

During fabrication of the assembly 20 the completed pillow assembly, i.e., pillow retainer 92 and pillow 100 is inserted within the assembled reaction housing 32. The openings 96 within the edge 94 of the pillow assembly 90 are registered relative to the opening 48 and 62 in the retainer housing 32 to facilitate attachment. Attachment can be accomplished by screws, bolts, rivets or the like as known in the art. A cover assembly 120 is secured to the reaction housing assembly at the shoulders 46 and reinforced portions 58. To accomplish this attachment a plurality of fasteners may extend through openings 122 of the cover assembly into opening 124 in the portions 58 and openings 48 in the shoulders 46. In view of the above, the cover assembly 120 is secured to the reaction housing assembly separately from the attachment of the pillow assembly.

In the present invention the cover assembly 120 comprises a decorative outer cover 130 to conform with the style, color and shape of the instrument panel. The cover 130 is fabricated of a reinforced plastic material such as polyurethene. The cover 130 includes upper and lower cover portions 132 and 134 which upon deployment of the air bag may rupture along a line 136 separating the two portions. The cover assembly 120 is designed such that upon deployment of the air bag the upper and lower portions 132 and 134 would respectively rotate about integrally formed hinged portions 140 and 142 of the cover, thereby permitting the air bag to expand therethrough while securing these rupturable portions in place.

By utilizing a pillow retainer such as 92 which comprises a relatively rigid member, and by attaching same to the reaction housing assembly 30 in a manner recessed from the open mouth 40 provides for increased rigidity of the entire air bag assembly 20. By virtue of this type of attachment, the air bag reaction forces are removed from the mouth portion 44 of the reaction housing assembly thereby preventing excess deformation of the assembly 30 and preventing damage to closely spaced portions of the vehicle such as the instrument panel. This advantage is accomplished without a significant increase in the weight of the assembly 20.

Further, the gas generator 72 may optionally be included within the air bag assembly. The structure of the present invention further provides additional advantages such as the gas inflator 72 may be assembled or disassembled from the balance of the air bag assembly 20 without effecting a) the pillow or cover assemblies, or b) their assembly sequence. This advantage represents an important convenience in the logistics of the manufacturing cycle.

Figure 4:
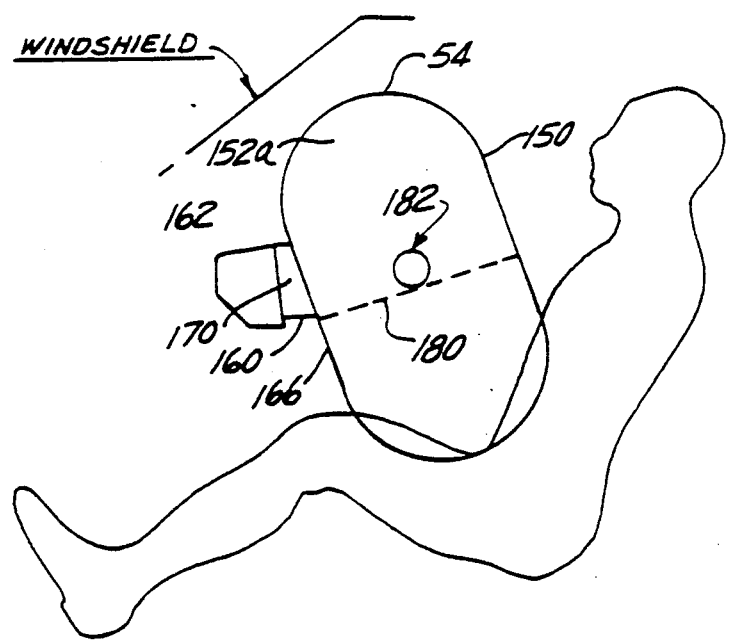
FIG. 4 illustrates a diagrammatic representation of an inflated pillow or air bag.

As mentioned above, the pillow assembly 90 comprises the pillow retainer and pillow (or air bag) 100. The pillow is stored in a compact, folded form between the pillow retainer 92 and cover 120 and deploys and inflates in response to the gases directed to it on initiation of the gas generator. The inflated pillow thereupon forms a loaddistributing and energy-absorbing structure for interaction with and protection of the occupant(s) during a crash event as illustrated in FIG. 4. FIG. 4 illustrates a schematic side view of an inflated pillow 100. The pillow 100 comprises a generally eliptically shaped tube extending, in its inflated state, perpendicular to the occupant. The tube may be fabricated of a woven material such as 420-denier uncoated nylon. The pillow further includes a plurality of generally parallel flat end panels 152a,b (panel 152b is not visible in FIG. 4). These end panels 152 may be sewn to the primary tube portion 154 forming its generally eliptical cylindrical shape. Extending from the primary bag portion is a smaller second tube or neck portion 160, one end of which 162 is adapted for attachment to the pillow retainer in the manner discussed below, while its other end 164 may be attached by sewing to a cooperating portion 166 of the primary pillow portion. This second portion 160 may be sewn to the primary air bag portion 54 at a seam that intersects it at right angles to its surface.

The end 162 of the tube 160 may be hemmed to provide a means of attachment with the pillow retainer. This hem 190 will also provide a means for reinforcing the pillow proximate the attachment points to the pillow retainer. FIG. 5a more specifically illustrates the above means of attachment. FIG. 6 illustrates such attachment without the use of a hem. FIG. 5a illustrates an enlarged view of certain components of the assembly 20. The hem 190 fabricated at the end 162 of the second tube 160 is essentially rectangular to comport with the generally rectangular dimensions of the rim 94 of the pillow retainer 92. The hem 190 is initially fitted about the circumference of the rim 92 such that it achieves the position shown in the solid lines of FIG. 5a. Thereafter, the pillow 100 and hem 190 are moved forward relative to the retainer 92 to achieve the orientation shown by the dotted lines and numeral 190. As can be appreciated, the hem 190 is formed as an open V-shape secured by stitching 192. Upon movement of the hem and air bag forward the open V-shape engages the end of the edge 94, thereby enveloping same. The retainer 92 with the hem 190 in place is aligned to the openings 62a–d within the retainer assembly 30 thereafter a fastener such as a rivet 196 is inserted within the openings 62 through the fabric of the air pillow and into the corresponding openings 96 in the retainer, thereby doubly securing the air bag to the retainer. In this configuration the lower flap 198 of the hem 190 will provide an enhanced seal about the fastener 196, preventing gases generated by the gas generator 72 from exiting about the rivets 196. FIG. 5b illustrates a double hem 190' which is functionally similar to hem 190.

Referring again to FIG. 4, the dimensions of the sides 170 of the smaller tube 160 may be dissimilar such as to enhance the angular deployment orientation of the inflated pillow relative to the occupant as illustrated in FIG. 4.

The pillow 100 may further include webbing or fabric tethers 180 (shown as dotted lines in FIGURE 4) on both sides of the attachment area of the smaller tube or neck 160 to opposite points of the deployed primary tube 154. The orientation of the tethers is such as to coincide with an angle drawn to a typical occupant's shoulder. These tethers 180 will operate to reduce extension of the bag upon initial deployment to position the bag for correct placememt relative to occupant kinematics. Further, the pillow 100 may include at least one discrete vent 182 of approximately 6 centimeters (two inches) in diameter or approximately 12.42 mm$^2$, which has shown to be advantageous in improving chest loading and occupant rebound. In addition, the discrete vent 132 will provide a fairly rapid means for venting or deflating the previously inflated pillow.

Many changes and modifications in the above described embodiment of the invention can, of course, be carried out without departing from the scope thereof. Accordingly, that scope is intended to be limited only by the scope of the appended claims.

I claim:

1. An air bag assembly (20) comprising:
    a reaction housing assembly (30) comprising a first member (34) defining top (50), bottom (52) and rear wall (54), and a plurality of end plates (40a,b) adapted to mate with open ends (56a,b) of the first member (34), the first member (34) and end plates (40a,b) defining an open mouth (44);
    the end plates including means for securing a gas generator thereto;
    a pillow assembly (90) including a pillow retainer (92) received into and recessed rearward of the open mouth (44), and circumferentially secured to the reaction housing assembly and an inflatable pillow (100) or air bag attached to the pillow retainer (82); the pillow stored in a compact, predeployment condition prior to inflation;
    cover assembly means (120) for protecting the pillow (100) in its predeployment condition, the cover assembly means (120) being ruptured by the pillow (100) during deployment thereof.

2. The air bag assembly as defined in claim 1 further including a gas generator means (72), responsive to a control signal for generating a quantity of gas to rapidly inflate the pillow, the gas generator means supported by the securing means.

3. The assembly as defined in claim 2 wherein the securing means includes a clearance hole (70) in a first one (40a) of the end plates (40a,b) and an outwardly extending recessed boss (72) in a second end plate (40a).

4. The air bag assembly (20) as defined in claim 3 wherein the gas generator means (72) is received within the reaction housing assembly through the clearance hole (70) and adapted to securely fit within the recessed boss (72) and is secured to the reaction housing assembly (30), proximate the clearance hole (70) by an end retainer (80).

5. The assembly (20) as defined in claim 1 wherein the pillow retainer (92) is recessed into the reaction housing assembly approximated one-half the distance between the open mouth (44) and the rear wall (54).

6. The assembly (20) as defined in claim 1 wherein the pillow retainer (92) includes at least one aperture (98a-c) through which gases may pass to inflate the pillow (100).

7. The assembly as defined in claim 6 wherein the cover assembly means (120) is attached to the reaction housing assembly (30) at a lip portion (46, 58) about the open mouth (44).

8. The assembly as defined in claim 1 wherein the retainer means (92) includes an inwardly extending edge (94) and wherein the air pillow (100) includes an open end having a shape comporting with the circumferential dimensions of the retainer means (92), wherein pillow material proximate the open end is formed as a seal (190,190').

9. The assembly as defined in claim 8 wherein the seal comprises pillow material formed is a V-shape wherein one leg of the V-shaped material is positioned between the reaction housing assembly means (30) and the other leg of the V-shaped material extends below the inwardly extending edge (94) of the retainer means (92).

* * * * *